United States Patent
Midtlyng

(10) Patent No.: US 12,304,256 B1
(45) Date of Patent: May 20, 2025

(54) AIR CHUCK WITH LEAK-PREVENTION AND SINGLE ROTARY ATTACHMENT FUNCTION

(71) Applicant: Richard Midtlyng, Robbinsdale, MN (US)

(72) Inventor: Richard Midtlyng, Robbinsdale, MN (US)

( * ) Notice: Subject to any disclaimer, the term of this patent is extended or adjusted under 35 U.S.C. 154(b) by 0 days.

(21) Appl. No.: 18/984,862

(22) Filed: Dec. 17, 2024

(51) Int. Cl.
| | |
|---|---|
| B60C 29/06 | (2006.01) |
| B60C 29/00 | (2006.01) |
| F16K 15/20 | (2006.01) |
| F16L 29/02 | (2006.01) |

(52) U.S. Cl.
CPC .......... B60C 29/066 (2013.01); B60C 29/002 (2013.01); *F16K 15/20* (2013.01); *F16L 29/02* (2013.01); *Y10T 137/3724* (2015.04)

(58) Field of Classification Search
CPC ........ F04B 33/005; F16K 15/20; F16L 29/02; Y10T 137/3724
USPC .......... 141/38; 152/415; 251/149.4; 285/309
See application file for complete search history.

(56) References Cited

U.S. PATENT DOCUMENTS

| | | | | |
|---|---|---|---|---|
| 495,064 | A * | 4/1893 | Schrader | F16K 1/00 251/340 |
| 505,486 | A | 9/1893 | Schrader | |
| 1,329,776 | A * | 2/1920 | Kraft | F16K 15/20 137/233 |
| 2,112,519 | A * | 3/1938 | Clo | F16L 29/02 285/280 |
| 2,218,318 | A * | 10/1940 | Pfauser | F16L 29/04 137/614.04 |
| 2,881,011 | A * | 4/1959 | Coughlin | F16L 29/02 137/557 |
| 2,931,668 | A * | 4/1960 | Baley | F16L 29/04 137/614.04 |
| 3,421,535 | A | 1/1969 | Hawkes et al. | |
| 3,592,439 | A * | 7/1971 | Ritchie, Jr. | F16K 15/20 251/149.6 |
| 3,786,831 | A | 1/1974 | Clippard | |
| 3,807,687 | A * | 4/1974 | Thompson | F16L 29/02 251/149.6 |
| 4,017,057 | A * | 4/1977 | Strybel | F16L 29/00 251/149.6 |

(Continued)

OTHER PUBLICATIONS

Clippard Instrument Laboratory, Inc., "Clippard part No. MQC-F", "screenshots of web page: www.clippard.com/part/MQC-F", Nov. 2015.

(Continued)

*Primary Examiner* — Robert K Arundale
(74) *Attorney, Agent, or Firm* — Charles A. Lemaire; Lemaire Patent Law Firm, P.L.L.C.

(57) ABSTRACT

An air chuck for use with tire stems (or other air vessels) that use Schrader valves. In some embodiments, the air chuck has an outer threaded part that is rotated to urge a core with an O-ring to form a seal with the inner surface of the tire stem, preventing air leaks. The air chuck attaches via a single multi-turn rotary motion, which first creates the seal and then depresses the Schrader valve to allow air flow. This design offers improved air-pressure accuracy, simplicity, efficiency, ease of use, and reliability. Some embodiments further include a manually operable air valve and an air-pressure gauge operatively coupled to the air chuck.

20 Claims, 5 Drawing Sheets

(56) References Cited

U.S. PATENT DOCUMENTS

| | | | | |
|---|---|---|---|---|
| 4,328,948 | A * | 5/1982 | Pearl | F16L 29/02 251/149.6 |
| 4,413,806 | A | 11/1983 | Anderson | |
| 5,857,481 | A * | 1/1999 | Zimmerman | B60S 5/043 137/227 |
| 6,032,691 | A * | 3/2000 | Powell | F16L 29/04 137/614.04 |
| 6,220,836 | B1 * | 4/2001 | Wu | F04B 33/005 417/467 |
| 6,250,603 | B1 * | 6/2001 | Knowles | F25B 41/40 251/149.6 |
| 6,279,608 | B1 * | 8/2001 | Langeveld | F16L 41/16 137/557 |
| 6,904,932 | B1 * | 6/2005 | Haraughty | F16K 15/20 137/231 |
| 9,309,980 | B2 | 4/2016 | Ward et al. | |
| 11,719,351 | B2 | 8/2023 | Quintana | |
| 11,754,212 | B2 * | 9/2023 | Wolf | F16L 29/02 251/142 |
| 2005/0000568 | A1 * | 1/2005 | Nikolayev | F16L 37/23 137/231 |
| 2005/0194557 | A1 * | 9/2005 | Hall | F16K 15/025 251/149.4 |
| 2020/0011441 | A1 * | 1/2020 | Emi | B60S 5/04 |

OTHER PUBLICATIONS

Clippard Instrument Laboratory, Inc., "Minimatic Quick Connect", "screenshots from catalogue web page: https://www.airengr.com/Clippard/Clippard_Full-Line_Catalog.pdf", 2015, pp. 331-332.

* cited by examiner

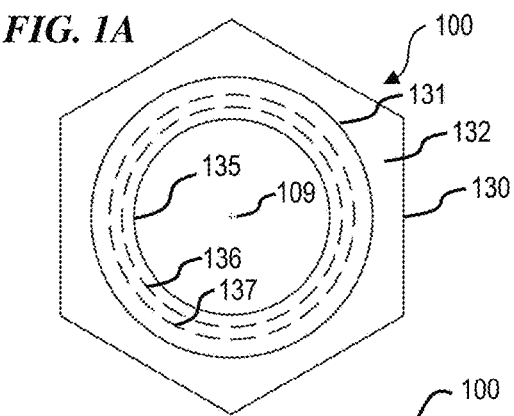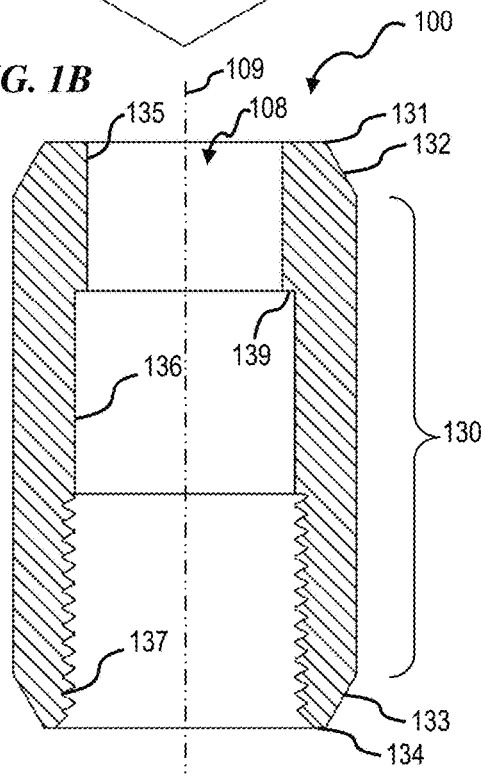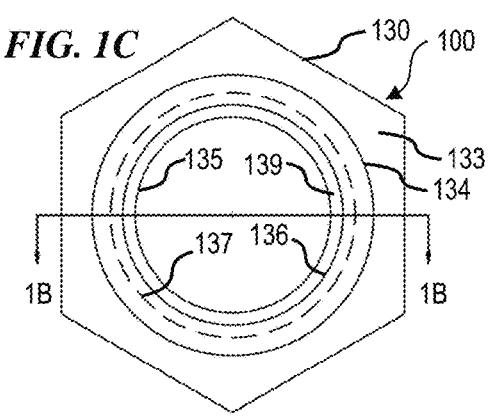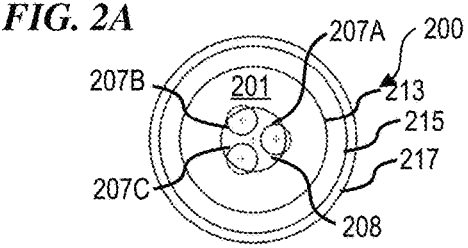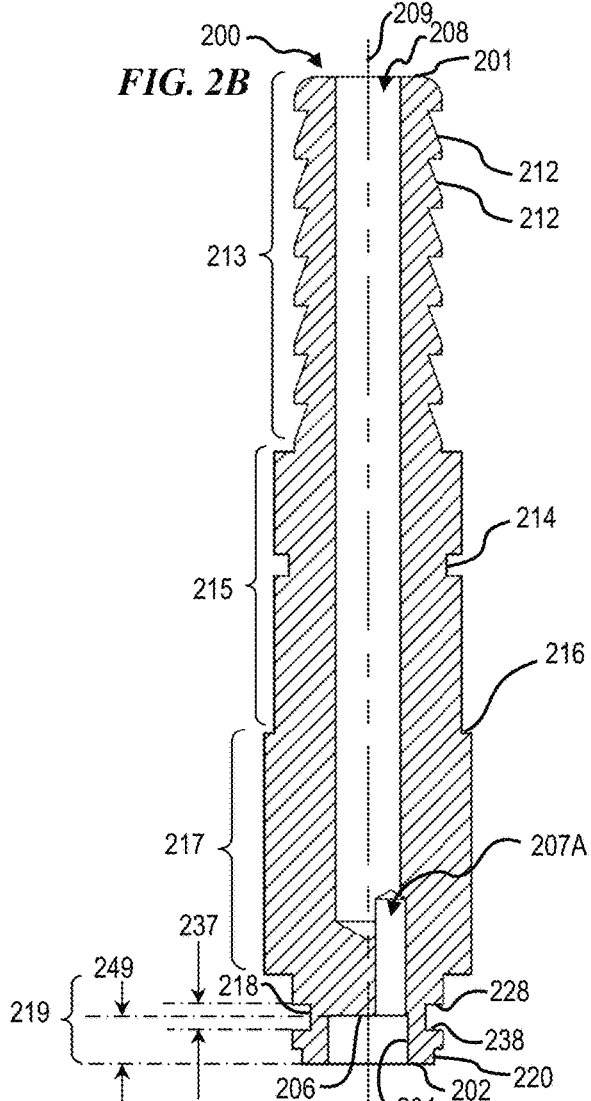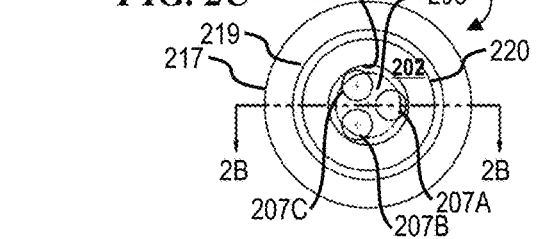

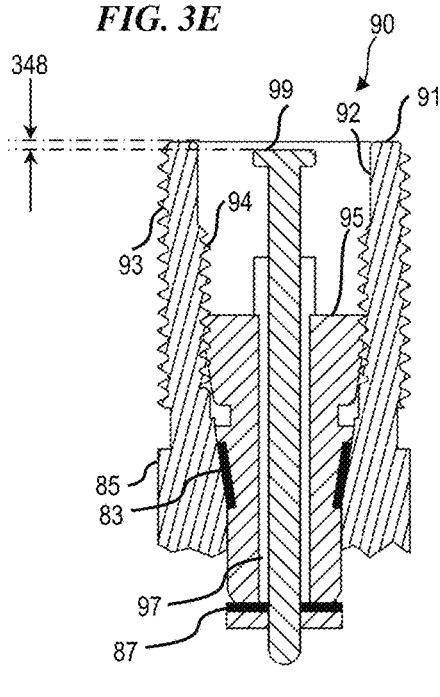
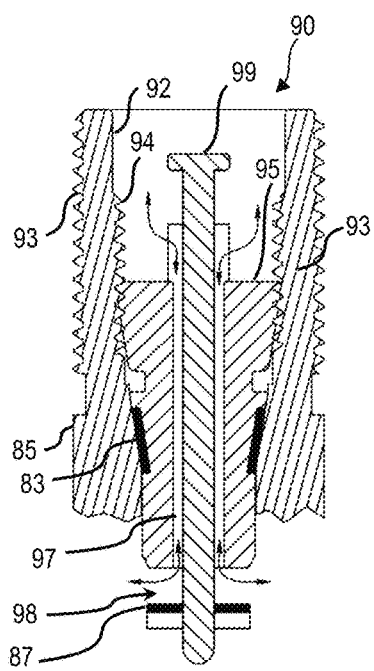
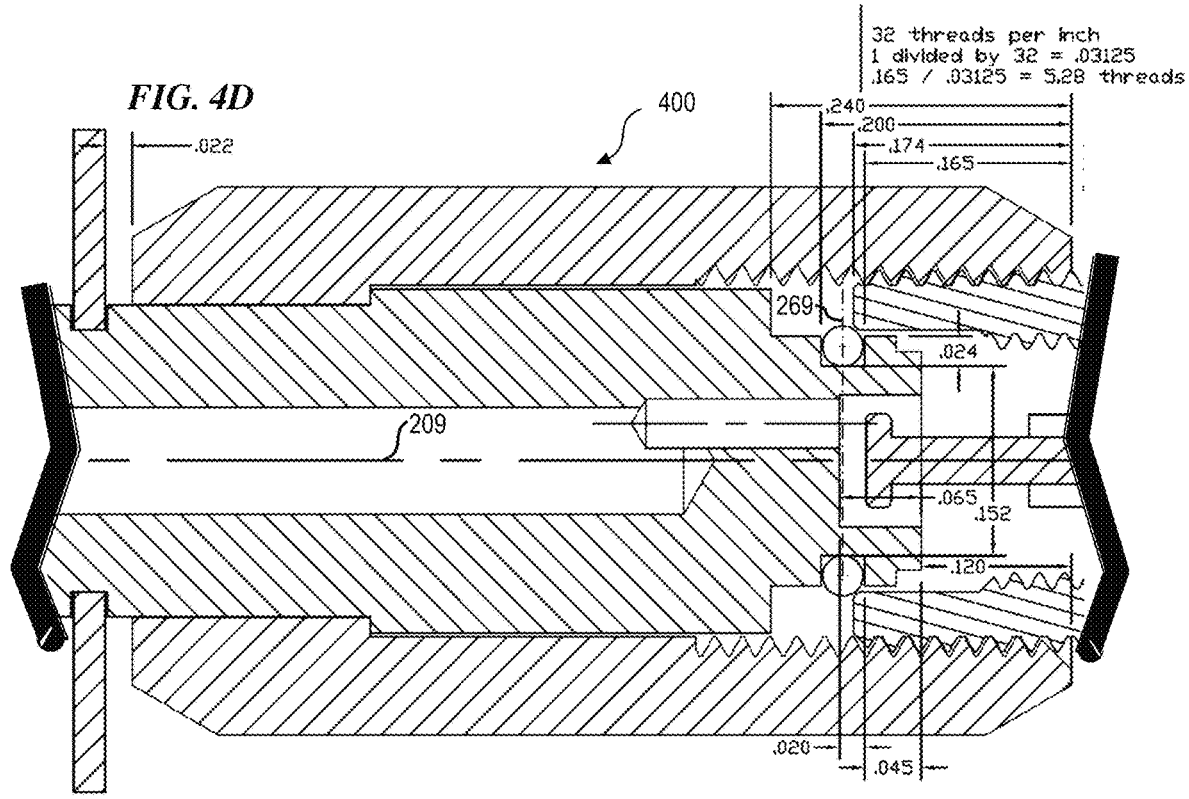

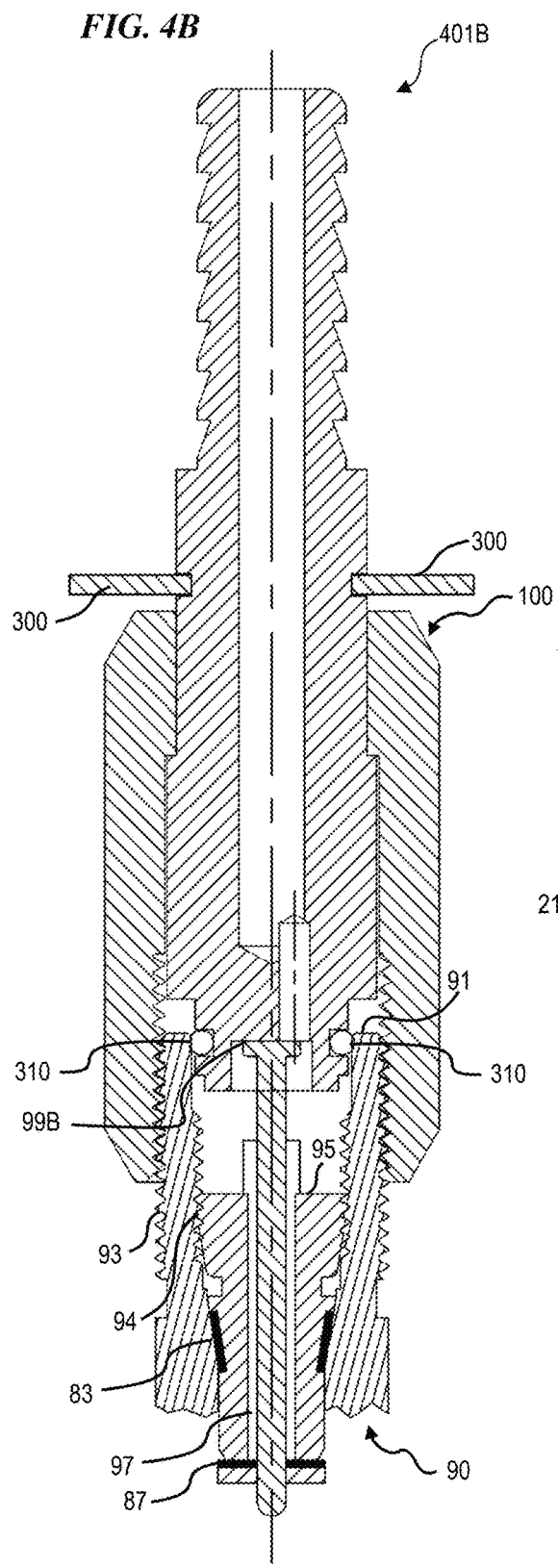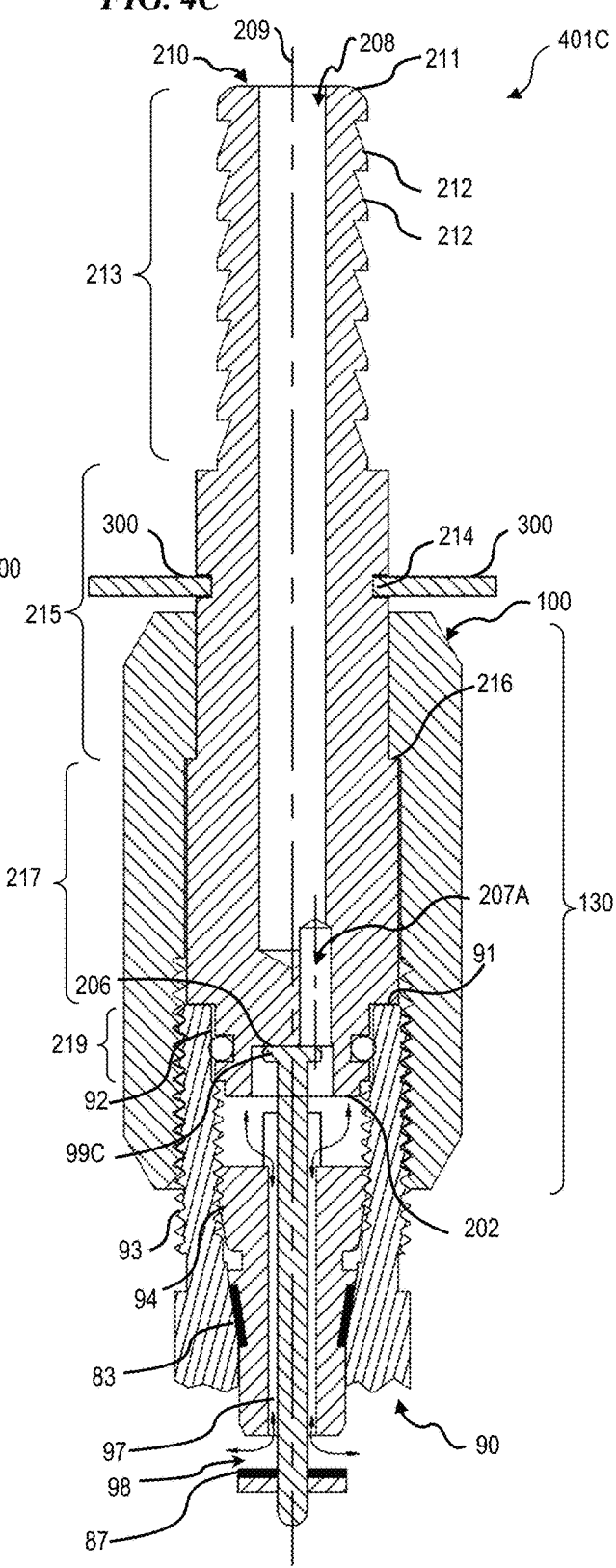

AIR CHUCK WITH LEAK-PREVENTION AND SINGLE ROTARY ATTACHMENT FUNCTION

CROSS-REFERENCE TO RELATED APPLICATION

This application is related to U.S. patent application Ser. No. 18/983,742, filed Dec. 17, 2024 by Richard Midtlyng and titled "Air chuck with leak-prevention and single rotary attachment function," which is incorporated herein by reference in its entirety.

FIELD OF THE INVENTION

The present invention relates to devices and methods for pneumatic attachment, and in particular to an air chuck designed for use with tire stems equipped with a Schrader valve, wherein the air chuck, when being attached, attaches with a single rotary motion that, upon multiple rotations successively engaging successive threads of the valve stem, first seals the pneumatic path in the air chuck to the tire stem and then, upon further rotations. opens the Schrader valve, and wherein the air chuck, when being removed, is removed with a single (multiple rotation) rotary motion that first allows the Schrader valve to close the pneumatic path from the tire stem, and then unseals the pneumatic path from the tire stem to the air chuck.

BACKGROUND OF THE INVENTION

Prior-art air chucks often suffer from air leaks during attachment and detachment to Schrader valves, reducing air-pressure measurement accuracy and filling efficiency, and causing inconvenience. Prior-art air chucks that have an internal rubber gasket that presses against the end of the tire stem can be difficult to press sufficiently to get a good seal and tend to leak air when connecting and when disconnecting. Some prior-art no-loss air chucks attempt to address this problem using two or more rotary mechanisms—for example, one rotary mechanism to attach such an air chuck to the threaded tire stem, and another rotary mechanism to open the Schrader valve. Other prior-art low-loss modular quick connector caps, such as part number MQC-F available from the Clippard company (e.g., www.clippard.com/part/MQC-F), have a protrusion, which is used to open a subject valve, that extends further than the distal end of the inside threads used to connect such modular quick connectors to the outer threads of a subject valve stem, and this arrangement and valve-opening protrusion prevents use of such modular quick connectors for low-loss or lossless connection (needed for accurate measurement of tire pressure) to the tire stems of tires of motor vehicles or many types of bicycles, due to the valve opening upon contact with the protrusion before a seal is possible.

As used herein, the term "Schrader valve" refers to, and is defined as, a pneumatic valve mechanism, within a tire stem, that is recessed (by distance 348 of FIG. 3E) no more than 0.03 inches (0.76 mm), and typically about 0.01 inches (0.26 mm) from the distal end of the tire stem, and that valve is selectively opened and closed by moving a piston extending from a valve core towards the external distal end of the valve stem. According to wiki.com: "The Schrader valve (also called American valve) is a type of pneumatic tire valve used on virtually every motor vehicle in the world today. The Schrader company, for which [the Schrader valve] was named, was founded in 1844 by August Schrader. The original Schrader valve design was invented in 1891, and patented in the United States in 1893." August Schrader is listed as an inventor on U.S. Pat. No. 495,064, patented Apr. 11, 1893, and U.S. Pat. No. 505,486 patented Sep. 26, 1893, each of which is incorporated herein by reference.

The Schrader valve has since changed over time, and typically includes a valve core that is threaded into an interior channel in a valve stem (for tires, the valve stem is referred to as a tire stem). The valve core typically includes a spring-loaded poppet valve that is opened by pressing against a piston that extends through the exterior end of the core. Schrader valves are used on many types of bicycle tires as well as virtually every motor vehicle in the world today, as mentioned above.

SUMMARY OF THE INVENTION

The present invention provides an air chuck that prevents air leaks by incorporating an O-ring seal that interfaces with the inner surface of the tire stem. The air chuck attaches to the tire stem with a single rotary motion, ensuring a secure seal before opening the Schrader valve. This design simplifies operation and enhances reliability, making it suitable for use in automotive, bicycle, and other pneumatic applications.

Some embodiments provide an air-chuck system for use with a tire stem having a Schrader valve. This air-chuck system provides: an air chuck that includes: a twist-on cap; and a pneumatic seal-and-valve-actuator core held partially within the twist-on cap. In some embodiments, the twist-on cap has interior threads that engage outer threads of the tire stem to allow a user to easily attach the air chuck to the tire stem, seal the air pathway, and actuate opening of the Schrader valve with a single rotational motion of the twist-on cap, the pneumatic core includes an air passageway extending from an outer end to an inner end, a first portion of the pneumatic core includes a flexible, resilient seal positioned on the pneumatic core to seal against an inner circumference of the tire stem to form a seal of the air passageway to the tire stem, and the first portion is configured to be gradually urged into the tire stem as the twist-on cap is rotated relative to the tire stem to engage successive ones of the outer threads of the tire stem, such that upon rotation of the twist-on cap by a sufficient number of turns, the flexible, resilient seal seals to an inner circumference of the tire stem, and upon further rotation of the twist-on cap, the pneumatic core actuates the Schrader valve to open after the seal is established.

In some embodiments of the air-chuck system, the first portion of the pneumatic core includes an outer circumferential O-ring groove, wherein the flexible, resilient seal is an O-ring made of rubber or a similar elastomeric material that is positioned in the O-ring groove to seal between the first portion of the pneumatic core and an inner cylindrical surface of the tire stem, wherein the first portion of the pneumatic core includes a surface (in some embodiments, a flat surface, or, in other embodiments, the surface of a pin or protrusion), configured to engage and open the Schrader valve after the air passageway is sealed to the tire stem, wherein an outer portion of the pneumatic core includes a circumferential retainer-ring groove, and wherein the air chuck further includes a retainer ring that is positioned in the retainer-ring groove and configured to engage the retainer-ring groove to prevent dislodgement of the pneumatic core during operation.

BRIEF DESCRIPTION OF THE FIGURES

FIG. 1A is a top-end view of twist-on cap 100, according to some embodiments of the present invention.

FIG. 1B is a longitudinal cross-section view of twist-on cap 100, according to some embodiments of the present invention.

FIG. 1C is a bottom-end view of twist-on cap 100, according to some embodiments of the present invention.

FIG. 2A is a top-end view of pneumatic seal-and-valve-actuator core 200, according to some embodiments of the present invention.

FIG. 2B is a longitudinal cross-section view of pneumatic seal-and-valve-actuator core 200, according to some embodiments of the present invention.

FIG. 2C is a bottom-end view of pneumatic seal-and-valve-actuator core 200, according to some embodiments of the present invention.

FIG. 3E is a schematic longitudinal cross-section view of tire stem 90 with piston 99 not depressed, according to some embodiments of the present invention.

FIG. 3F is a schematic longitudinal cross-section view of tire stem 90 with piston 99 depressed, according to some embodiments of the present invention.

FIG. 4B is a longitudinal cross-section view of air chuck 400, shown in a second position 401B, according to some embodiments of the present invention.

FIG. 4C is a longitudinal cross-section view of air chuck 400, shown in a third position 401C, according to some embodiments of the present invention.

FIG. 4D is a longitudinal cross-section view of a portion of air chuck 400, to illustrate certain dimensions and distances, according to some embodiments of the present invention.

DETAILED DESCRIPTION OF THE INVENTION

Figure 3A:
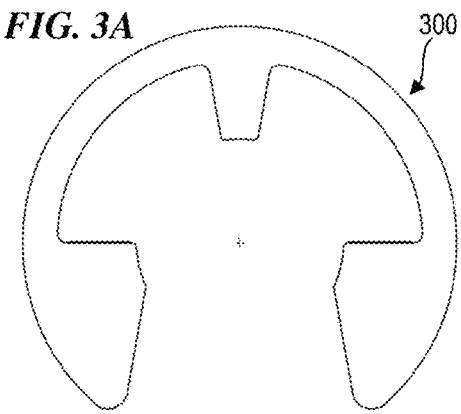
FIG. 3A is a top-end view of retainer clip 300, according to some embodiments of the present invention.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Components of air chuck 400:
  a. Twist-on cap 100: a threaded connector, also called a rotary attachment mechanism, that engages the outer threads of the tire stem to allow the user to easily attach the air chuck to a valve stem 90 (when valve stem 90 is attached to a tire, it is referred to as tire stem 90) with a single (multiple rotation) rotational motion.
  b. Pneumatic seal-and-valve-actuator core 200, that is gradually urged against the tire stem as the twist-on cap 100 successively engages the outer threads of the tire stem, and that seals the air passageway, a portion of which is channel 208, between an air source 96 and the tire stem, then actuates the Schrader valve of core 95 to open after the seal is established; pneumatic seal-and-valve-actuator core 200 is the main body of the air chuck and is made of durable material such as brass, polymer or aluminum, designed to withstand high pressures. Pneumatic seal-and-valve-actuator core 200 includes:
    i. O-ring groove 218: a seat that retains O-ring 310 and that forms part of the seal.
    ii. Valve actuator 206: A surface portion or pin recessed in pneumatic core 200 further in than the distal edge of O-ring groove 218 such that the O-ring seal is sealed before the valve actuator surface 206 reaches the valve piston, and recessed well within the distal end of twist-on cap 100 of air chuck 400 that opens the Schrader valve after the pneumatic passageway is sealed.
    iii. Air passageway 208: A pneumatic conduit within the pneumatic core 200 that allows air to flow from the connected air source to the tire stem once the Schrader valve is opened.
    iv. Retainer-ring groove 214.
  c. Retainer clip 300.

d. O-ring 310: A flexible, resilient seal positioned at the junction between pneumatic core 200 and inner circumference of tire stem 90. In some embodiments, O-ring 310 is made of rubber or similar elastomeric material and is seated in a dedicated groove 218 of pneumatic core 200 inside twist-on cap 100. In some embodiments, groove 218 is 0.035" wide (width 237 in FIG. 2B) from its top wall 228 (i.e., the proximal wall relative to the first end 201 pneumatic core 200) to its bottom wall 238, and the inner diameter of grove 218 is 0.152" and the cross-section thickness of the O-ring is 0.032", so the depth of groove is 0.024" so that the O-ring 310 protrudes radially. In some embodiments, valve actuator surface 206 is recessed into pneumatic seal-and-valve-actuator core 200 further than the bottom wall 238.

Operation:

a. The user aligns the air chuck 400 with the tire stem 90 and rotates the twist-on cap 100, engaging the rotary mechanism of twist-on cap 100 (e.g., interior threads 137) with the outer threads of tire stem 90.

b. As the twist-on cap 100 advances on threads of the tire stem, the O-ring 310 compresses against the inner surface of the tire stem 90, creating an airtight seal.

c. Continued rotation brings the valve actuator 306 into contact with the Schrader valve piston 99, depressing Schrader valve piston 99 to open the Schrader valve 95 to allow air flow.

d. To detach, the user rotates the twist-on cap 100 in the opposite direction, retracting the valve actuator 206 before breaking the seal, preventing sudden air loss.

Advantages:

a. Accuracy: The air-pressure measurement reflects the end pressure in the tire, since the air passageway from the tire stem to a connected air gauge remains sealed until disengagement of the air chuck 400 has first closed the Schrader valve in the tire stem.

b. Leak Prevention: The O-ring ensures a tight seal, minimizing air leakage during attachment and detachment.

c. Ease of Use: The single rotary motion simplifies the process, reducing the time and effort required.

d. Compatibility: The design is compatible with standard Schrader valves, making it versatile and widely applicable.

e. Durability: The use of robust materials ensures long-term reliability and resistance to wear.

FIG. 1A is a top-end view of twist-on cap 100, according to some embodiments of the present invention. In some embodiments, for example, twist-on cap 100 has a hexagonal external cross section shape 130, a chamfered top conical surface 132 that extends up to top flat surface 131 that provides a bearing surface for pushing against retainer clip 300 during disengagement of the air chuck (see FIG. 4A). In other embodiments, the external shape of twist-on cap 100 has other suitable profiles, such as a knurled, generally cylindrical profile, a winged profile with two relatively large metal "wings," one on each side, such as are commonly used for wing nuts (also called butterfly nuts), or other suitable shape to facilitate manual rotation connection of twist-on cap 100 to a complementary tire stem 99. Note that pneumatic seal-and-valve-actuator core 200 is rotatably retained in place in twist-on cap 100 by retainer clip 300 (see FIG. 3A) on the outside, and by interior ledge 139 (see FIG. 1B) of twist-on cap 100 that rests against outer ledge 216 (see FIG. 2B) of pneumatic seal-and-valve-actuator core 200 (see FIG. 2A). The remaining reference numbers are described below.

FIG. 1B is a longitudinal cross-section view of twist-on cap 100, according to some embodiments of the present invention. In some embodiments, twist-on cap 100 includes a central channel 108 having a smaller-diameter first cylindrical inner wall 135 and slightly larger-diameter second cylindrical inner wall 136 both centered on center longitudinal axis 109, with a planar ledge 139 at the junction between first cylindrical inner wall 135 and second cylindrical inner wall 136. The lower portion of central channel 108 between top surface 131 and bottom surface 134 (note that central channel 108 is isolated from air passageway 208 once the seal is established between pneumatic seal-and-valve-actuator core 200 and tire stem 90) is threaded with inside threads 137 that match corresponding outer threads 93 of a tire stem 90 such as shown in FIGS. 3E-3F and 4A-4C. FIG. 1C shows the location of cutline 1B for the cross section of FIG. 1B.

FIG. 1C is a bottom-end view of twist-on cap 100, according to some embodiments of the present invention. This view shows the bottom of planar ledge 139 at the junction between first cylindrical inner wall 135 and second cylindrical inner wall 136, and a dashed line indicating the outermost depth of threads 137 (in some embodiments, the innermost edge of threads 137 is the same as the diameter of cylindrical inner wall 136). This view also shows the bottom end surface 134 and the conical chamfer 133 that goes from hex outer surface 130 to bottom end surface 134.

FIG. 2A is a top-end view of pneumatic seal-and-valve-actuator core 200, according to some embodiments of the present invention. In some embodiments, though-hole channel 208 is drilled or otherwise formed centered on center longitudinal axis 209 through most of the length between top-end surface 201 and bottom-end surface 202 (see FIG. 2B), with one or more smaller holes (e.g., 207A, 207B and 207C) through the remaining length between top-end surface 201 and bottom-end surface 202, completing the air passageway through pneumatic core 200. The outer circumferences of barbed air-hose attachment section 213, first cylindrical section 215 and larger second cylindrical section 217 are shown.

FIG. 2B is a longitudinal cross-section view of pneumatic seal-and-valve-actuator core 200, according to some embodiments of the present invention. In some embodiments, pneumatic seal-and-valve-actuator core 200 includes a barbed air-hose attachment section 213 that includes a plurality of barbs 212, each having a conical top surface and flat bottom surface to facilitate one-way attachment of an air hose, as is well known in the art. In some embodiments, first cylindrical section 215 is sized to fit into, and easily rotate in first cylindrical inner wall 135 of twist-on cap 100, second cylindrical section 217 is sized to fit into, and easily rotate in second cylindrical inner wall 136 of twist-on cap 100, with ledge 139 of twist-on cap 100 pressing against, and rotating relative to, ledge 216 as twist-on cap 100 is rotated and screwed onto a tire stem 90. In some embodiments, circumferential groove 214 (in some embodiments, a cylindrical groove) in first cylindrical section 215 receives and retains a retaining clip 300 (e.g., an "E-clip" or other suitably shaped retaining device). In some embodiments, circumferential groove 218 (in some embodiments, a cylindrical groove) in third cylindrical section 219 receives and retains a flexible, resilient seal such as an O-ring 310). FIG. 2C shows the location of cutline 2B for the cross section of FIG. 2B, which indicates that one of the one or more spaced-apart bottom-drilled or otherwise formed holes (e.g., hole 207A in FIG. 2B) extends an air passageway from the bottom cylindrical depression having wall 204 through to top-drilled or otherwise formed hole 208. Surface 206, through which the spaced-apart one or more bottom-drilled or otherwise formed holes (e.g., hole 207A) are made, provides the actuating surface that presses against the piston 99 of the Schrader valve in tire stem 90. Cylindrical section 219 is sized to fit within the cylindrical top opening 92 in tire stem 90 such that O-ring 310 forms a seal between cylindrical top opening 92 and groove 218. In some embodiments, in order to avoid pressing against the inner threads 94 of tire stem 90, a small cylindrical section 220 is formed next to bottom surface 202, or in other embodiments (not shown), that bottom portion is conically chamfered. In some embodiments, groove 218 is 0.035" wide (width 237) from its top wall 228 to its bottom wall 238, and the inner diameter of grove 218 is 0.152" and the cross-section thickness of the O-ring is 0.032", and the depth of groove is 0.024" so that the O-ring 310 protrudes radially. In some embodiments, valve actuator surface 206 is recessed by a distance 249 from, or relative to, bottom end 202 of pneumatic seal-and-valve-actuator core 200 further than the bottom wall 238. In some embodiments, when ledge 139 is urged against ledge 216, the recessed depth (distance 258) of surface 206 inside the bottom 134 of the inside threads 137 of twist-on cap 100 is approximately 180" such that at least three threads, and typically about five to seven threads of a typical tire stem having 32 threads-per-inch (TPI, not necessarily shown to scale in the Figures), are engaged before actuator surface 206 comes into contact with piston 99. In some embodiments, actuator surface 206 is recessed by a distance 248 (e.g., in some embodiments, the distance (vertical distance in the Figure) from actuator surface 206 to O-ring groove bottom wall 238 is about 0.018"), actuator surface 206 is further from bottom end 202 of pneumatic seal-and-valve-actuator core 200 than is O-ring-groove bottom wall 238, which in some embodiments, distance 248 is about 0.045".

FIG. 2C is a bottom-end view of pneumatic seal-and-valve-actuator core 200, according to some embodiments of the present invention. This view shows the outer diameters of cylindrical section 217, cylindrical section 219, cylindrical section 220, the cylindrical wall 204, the three spaced-apart holes 207A, 207B and 207C of this embodiment, that leaves surface 206 used to actuate the Schrader valve in tire stem 90 once the air passageway is sealed.

FIG. 3A is a top-end view of retainer clip 300, according to some embodiments of the present invention. In some embodiments, for example, an E-shaped retainer ("E-clip"), as shown here, is used for retainer clip 300. In other embodiments, any of a number of suitable retainer clip shapes are used.

Figure 3B:
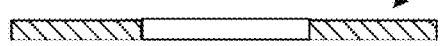
FIG. 3B is a longitudinal cross-section view of retainer clip 300, according to some embodiments of the present invention.

FIG. 3B is a longitudinal cross-section view of retainer clip 300, according to some embodiments of the present invention.

Figure 3C:
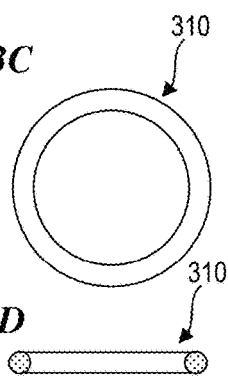
FIG. 3C is a top-end view of O-ring 310, according to some embodiments of the present invention.

FIG. 3C is a top-end view of O-ring 310 used for the flexible, resilient seal between pneumatic seal-and-valve-actuator core 200 and the tire stem 90, according to some embodiments of the present invention. In some embodiments, the flexible, resilient seal is a toroid-shaped O-ring 310 is used. In other embodiments, other shapes or types of flexible, resilient seal are used for the air-passageway-sealing function of the present invention.

Figure 3D:
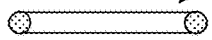
FIG. 3D is a longitudinal cross-section view of O-ring 310, according to some embodiments of the present invention.

FIG. 3D is a longitudinal cross-section view of O-ring 310, according to some embodiments of the present invention.

FIG. 3E is a schematic longitudinal cross-section view of tire stem 90, according to some embodiments of the present invention. This view shows tire stem 90 with piston 99 (for the pneumatic valve mechanism, within tire stem 90, that is recessed by distance 348 that is no more than 0.03 inches (0.76 mm), and typically about 0.01 inches (0.26 mm) from the distal end 91 of the tire stem 90) and its bottom seal 87 (which are a movable portion of valve insert, or core, 95, and which together with piston 99 and bottom seal 87 form a Schrader valve) in a not-depressed position (which would leave the valve closed to air). In some embodiments, tire stem 90 has exterior threads 93, interior threads 94 that are recessed relative to top surface 91 by a cylindrical inner wall 92 having a larger diameter that the inner diameter of interior threads 94. Resilient gasket 83 seals the valve core 95 to valve-stem housing 85. In some embodiments, cylindrical wall 92 provides a sliding surface against which O-ring 310 seals.

FIG. 3F is a schematic longitudinal cross-section view of tire stem 90 with piston 99 depressed, according to some embodiments of the present invention. This view shows tire stem 90 with piston 99 99 and its bottom seal 89 in a depressed position (which leave the valve space 98 open to air flow).

Figure 4A:
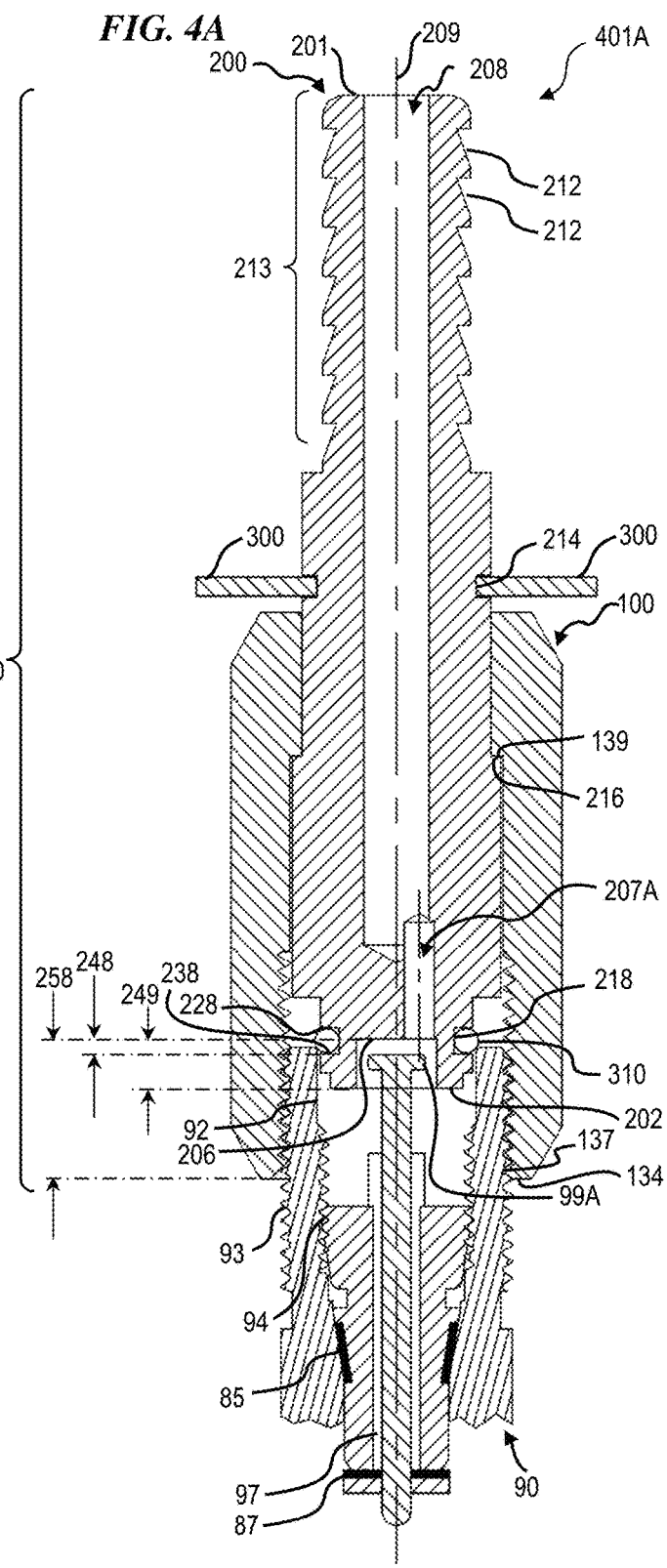
FIG. 4A is a longitudinal cross-section view of air chuck 400 with leak-prevention and single rotary attachment function, shown in a first position 401A, according to some embodiments of the present invention.

FIG. 4A is a longitudinal cross-section view of air chuck 400 with leak-prevention and single rotary attachment, sealing and actuation function, shown in a first arrangement or position 401A, according to some embodiments of the present invention. What is meant by "single rotary attachment, sealing and valve-actuation function" is that rotation of twist-on cap, upon multiple rotations successively engaging successive threads of the valve stem, then seals the pneumatic path in the air chuck 400 to the valve stem 90 and then, upon further rotations. opens the Schrader valve, and wherein the air chuck 400, when being removed, is removed with a single (multiple rotation) rotary motion that first allows the Schrader valve to close the pneumatic path from the valve stem 90, and then unseals the pneumatic path from the tire stem to the air chuck 400. In first arrangement 401A, twist-on cap 100 has been twisted onto several of the exterior threads 93 of tire stem 90, but piston 99 has not yet been contacted by actuator surface 206 of pneumatic seal-and-valve-actuator core 200. This extended position 99A (extended in the upward direction in this Figure) of piston 99 means that the Schrader valve of tire stem 90 is still closed. In some embodiments, the tip of cylindrical inner wall 92 has just started to touch O-ring 310.

Note that, in some embodiments, air chuck 400 (see FIGS. 4A-4C) is assembled by placing O-ring 310 into groove 218, then pneumatic seal-and-valve-actuator core 200 is inserted through central channel 108 of twist-on cap 100 from the bottom, and the E-clip 300 is installed in groove 214 such that pneumatic core 200 is held by ridge 216 against ridge 139 of twist-on cap 100 on the lower end of first cylindrical section 215, and by retaining ring 300 against top surface 131 at the top of twist-on cap 100. Note that, while cylindrical walls 135 and 136 of twist-on cap 100 are sized to easily rotate around pneumatic core 200, there is no requirement for these interfaces to be air tight since the seal for the air passageway is formed by O-ring 310.

FIG. 4B is a longitudinal cross-section view of air chuck 400, shown in a second arrangement or position 401B, according to some embodiments of the present invention. In second arrangement 401B, twist-on cap 100 has been twisted a few more full rotations (each such full rotation advances twist-on cap 100 one more thread) onto several of the exterior threads 93 of tire stem 90, such that piston 99 has just first contacted by actuator surface 206 of pneumatic seal-and-valve-actuator core 200. This contact position 99B of piston 99 means that the valve of tire stem 90 is still closed, but the O-ring 310 is now sealing the air passageway from hole 208 to the interior of tire stem 90. In some embodiments, the tip of cylindrical inner wall 92 has passed much or all of O-ring 310, forming an air-tight seal.

FIG. 4C is a longitudinal cross-section view of air chuck 400, shown in a third arrangement or position 401C, according to some embodiments of the present invention. In third arrangement 401C, twist-on cap 100 has been twisted a yet more full rotations (each such full rotation advances twist-on cap 100 one more thread) onto several of the exterior threads 93 of tire stem 90, such that piston 99 has been depressed by actuator surface 206 of pneumatic seal-and-valve-actuator core 200. This depressed position 99C of piston 99 means that the valve of tire stem 90 is fully open (note that the air channel 97 through Schrader valve 95, when the Schrader valve is open, extends through space 98 at the bottom of Schrader valve 95), and O-ring 310 is still sealing the air passageway from hole 208 to the interior of tire stem 90. In some embodiments, the sealing is enhanced by air-tool grease or oil applied the O-ring 310.

FIG. 4D is a longitudinal cross-section view of a portion of air chuck 400, to illustrate certain dimensions and distances, according to some embodiments of the present invention. In other embodiments, variations of these distances are used, in order that air chuck 400 provides: first, a supporting connection to the outer threads of tire stem 90 such that the plane 269 O-ring 310 is generally perpendicular to center axis 209, second, a seal to O-ring 310 is established, and third, actuator surface 206 presses against piston 99 and opens the Schrader valve.

Figure 5A:
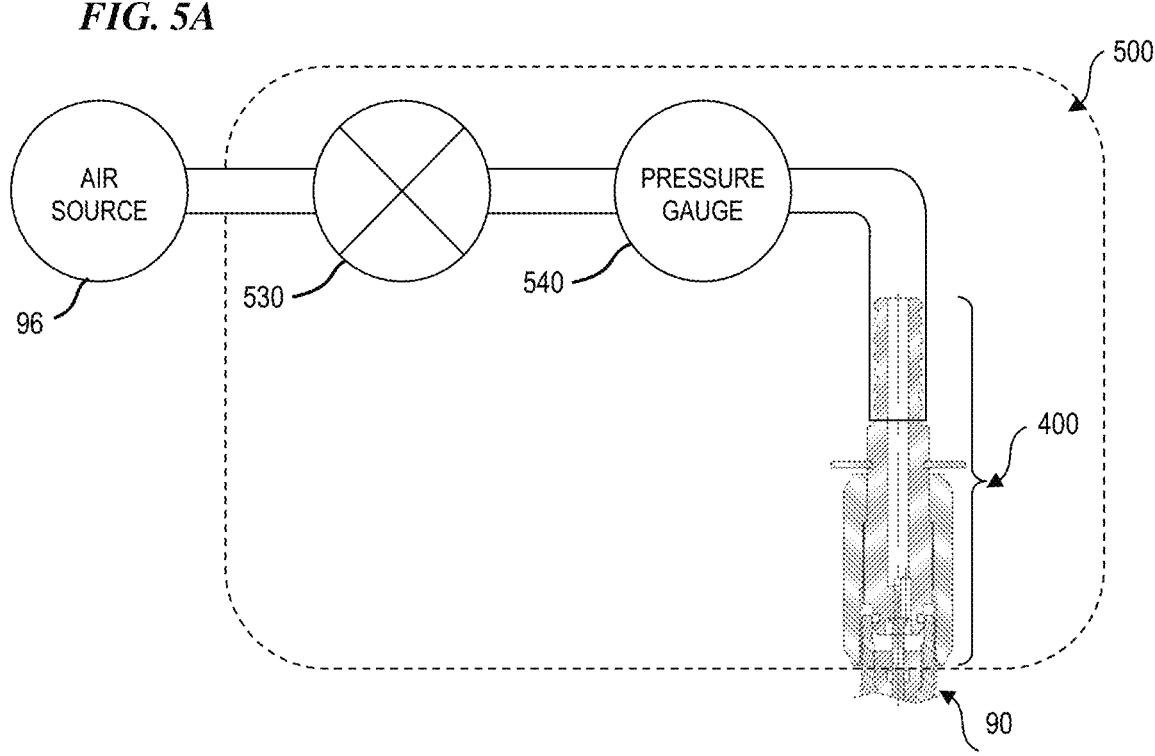
FIG. 5A is a schematic block diagram of an air chuck system 500 with inflator valve and pressure gauge with leak-prevention and single rotary attachment function, according to some embodiments of the present invention.

FIG. 5A is a schematic block diagram of an air chuck system 500 with inflator valve 530 and pressure gauge 540 with leak-prevention and single multi-turn rotary attachment function, according to some embodiments of the present invention. In some embodiments, air chuck system 500 includes an air valve 530, an air-pressure gauge 540, and an air chuck 400, as described above. In some embodiments, air valve 530 is configured to receive pressurized air from air source 96 (e.g., an air compressor), and to selectively open and close (e.g., in some embodiments, using a manually operated trigger lever or other actuator), and when open to supply air to air chuck 400, and when closed, to allow air-pressure gauge 540 to measure the air pressure in the tire or other air vessel connected to tire stem 90.

Figure 5C:
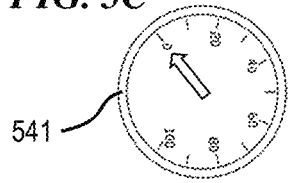
FIG. 5C is a top view of an analog air gauge display 541, according to some embodiments of the present invention.
Figure 5B:
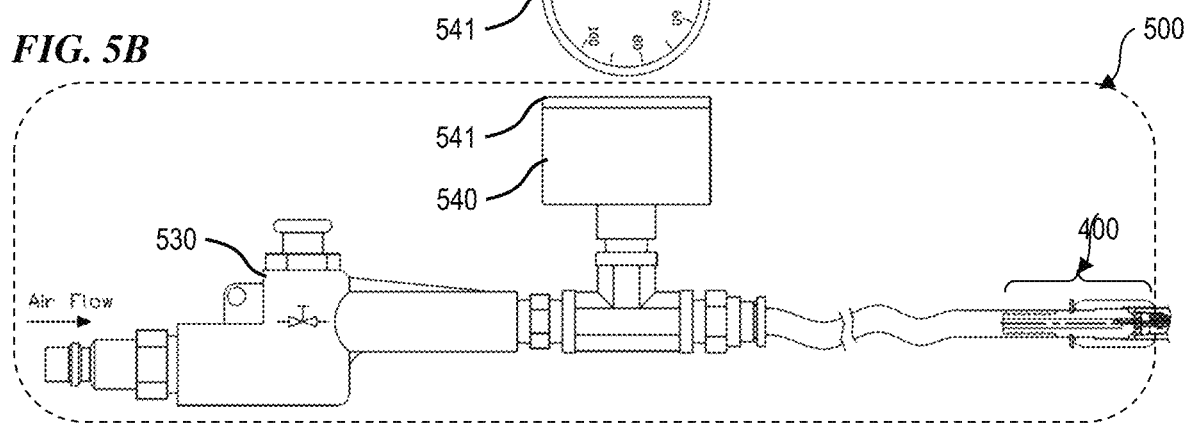
FIG. 5B is a side view of air chuck system 500 that includes a longitudinal cross-section view of air chuck 400, according to some embodiments of the present invention.

FIG. 5B is a side view of air chuck system 500 that includes a longitudinal cross-section view of air chuck 400, according to some embodiments of the present invention.

FIG. 5C is a top view of an analog air gauge display 541 of pressure gauge 540, according to some embodiments of the present invention. In other embodiments, a digital air-pressure gauge is used instead.

In some embodiments, the present invention provides an air-chuck system for use with a tire stem having a Schrader valve. This air-chuck system includes: an air chuck that includes: a twist-on cap 100; and a pneumatic seal-and-valve-actuator core 200 held partially within the twist-on cap, wherein the twist-on cap 100 has interior threads that engage outer threads of the tire stem to allow a user to attach the air chuck to the tire stem 90 with a single multi-turn rotational motion of the twist-on cap, wherein the pneumatic core 200 includes an air passageway extending from an outer end to an inner end, wherein a first portion of the pneumatic core 200 includes a flexible, resilient seal positioned on pneumatic core 200 to seal against an inner circumference of tire stem 90 to form a seal of the air passageway to the tire stem, wherein the first portion is configured to be gradually urged into the tire stem as the twist-on cap 100 is rotated relative to the tire stem to engage successive ones of the outer threads of the tire stem, such that upon rotation of twist-on cap 100 by a sufficient number of turns, the flexible, resilient seal seals to an inner circumference of the tire stem, and upon further rotation of twist-on cap 100, pneumatic core 200 actuates the Schrader valve to open after the seal is established.

In some embodiments of the air-chuck system, the first portion of the pneumatic core 200 includes an outer circumferential O-ring groove, wherein the flexible, resilient seal is an O-ring made of rubber or a similar elastomeric material that is positioned in the O-ring groove to seal between the first portion of the pneumatic core 200 and an inner cylindrical surface of the tire stem, wherein the first portion of the pneumatic core 200 includes a surface (in some embodiments, a flat surface 206, or, in other embodiments, the surface of a pin or protrusion, not shown here) configured to engage and open the Schrader valve after the air passageway is sealed to the tire stem, wherein an outer portion of the pneumatic core 200 includes a circumferential retainer-ring groove, and wherein the air chuck further includes a retainer ring 300 that is positioned in the retainer-ring groove and configured to engage the retainer-ring groove, wherein retainer ring 300 presses against top surface 131 of twist-on cap 100 as twist-on cap 100 is rotated to disengage from tire stem 90, and ledge 139 of twist-on cap 100 presses against ledge 216 of pneumatic core 200 when twist-on cap 100 is rotated to engage on tire stem 90 by advancing on threads of tire stem 90, to prevent dislodgement of the pneumatic core during operation.

In some embodiments of the air-chuck system, the flexible, resilient seal is made of rubber or a similar elastomeric material.

In some embodiments of the air-chuck system, the first portion of the pneumatic core 200 includes a circumferential O-ring groove, and wherein the flexible, resilient seal includes an O-ring made of rubber or a similar elastomeric material that is positioned in the O-ring groove.

In some embodiments of the air-chuck system, the O-ring groove is configured to securely position the O-ring within the tire stem to ensure a leak-proof seal between an inner surface of the tire stem and the first portion of the pneumatic core 200.

In some embodiments of the air-chuck system, the first portion of the pneumatic core 200 includes a surface (in some embodiments, a flat surface 206, or, in other embodiments, the surface of a pin or protrusion, not shown here) configured to engage and open the Schrader valve after the air passageway is sealed to the tire stem.

In some embodiments of the air-chuck system, an outer portion of the pneumatic core 200 includes a circumferential retainer-ring groove, and wherein the air chuck further includes a retainer ring that is positioned in the retainer-ring groove and configured to engage the retainer-ring groove to prevent dislodgement of the pneumatic core during operation.

In some embodiments of the air-chuck system, the air passageway allows air to flow from a connected air source to the tire stem upon the actuation of the Schrader valve.

Some embodiments of the air-chuck system further include an air valve having an input port and an output port; and an air-pressure gauge operatively coupled to the output port, wherein the air valve is configured to receive pressurized air from an air supply connected to the input port and to selectively open to allow air flow though the output port which is coupled to the air chuck, or to close to isolate the air supply from the air chuck and thus allow the air-pressure gauge to measure air pressure from the tire stem.

Some embodiments of the air-chuck system further include an air valve having an input port and an output port; and an air-pressure gauge operatively coupled to the output port, wherein the air valve is configured to receive pressurized air from an air supply connected to the input port and to selectively open to allow air flow though the output port which is coupled to the air chuck, or to close to isolate the air supply from the air chuck and thus allow the air-pressure gauge to measure air pressure from the tire stem, wherein the first portion of the pneumatic core 200 includes an outer circumferential O-ring groove, wherein the flexible, resilient seal is an O-ring made of rubber or a similar elastomeric material that is positioned in the O-ring groove to seal between the first portion of the pneumatic core 200 and an inner cylindrical surface of the tire stem, wherein the first portion of the pneumatic core 200 includes a surface, (in some embodiments, a flat surface 206, or, in other embodiments, the surface of a pin or protrusion) configured to engage and open the Schrader valve after the air passageway is sealed to the tire stem, wherein an outer portion of the pneumatic core 200 includes a circumferential retainer-ring groove, and wherein the air chuck further includes a retainer ring that is positioned in the retainer-ring groove and configured to engage the retainer-ring groove to prevent dislodgement of the pneumatic core during operation.

In some embodiments of the air-chuck system, pneumatic seal-and-valve-actuator core 200 is made of brass.

In some embodiments of the air-chuck system, pneumatic seal-and-valve-actuator core 200 is made of metal selected from the group consisting of aluminum, brass, and stainless steel.

In some embodiments of the air-chuck system, twist-on cap 100 is made of brass.

In some embodiments of the air-chuck system, twist-on cap 100 is made of metal selected from the group consisting of aluminum, brass, and stainless steel.

In some embodiments of the air-chuck system, pneumatic seal-and-valve-actuator core 200 and/or twist-on cap 100 are entirely made of, or partially made of, a polymer.

In some embodiments of the air-chuck system, pneumatic seal-and-valve-actuator core is at least partially made of a polymer.

In some embodiments of the air-chuck system, twist-on cap is at least partially made of a polymer.

In some embodiments of the air-chuck system, pneumatic seal-and-valve-actuator core 200 includes: an O-ring groove 218, and wherein the air chuck includes an O-ring 310 positioned substantially within the O-ring groove 218, and a valve actuator surface 206 such as a surface portion or pin of pneumatic core 200 that opens the Schrader valve after the pneumatic passageway is sealed, air passageway 208 that is a pneumatic conduit within the pneumatic core 200 that allows air to flow from the connected air source to the tire stem once the Schrader valve is opened. Some embodiments further include retainer-ring groove 214, and retainer clip 300, wherein O-ring 310 is a flexible, resilient seal positioned at a junction between pneumatic core 200 and an inner circumference of tire stem 90. In some embodiments, O-ring 310 is made of rubber or similar elastomeric material and is seated in the dedicated groove 218 of pneumatic core 200 inside twist-on cap 100.

In some embodiments of the air-chuck system, the first cylindrical portion of the pneumatic core includes an outer circumferential O-ring groove, wherein the flexible, resilient seal is an O-ring made of rubber or a similar elastomeric material that is positioned in the O-ring groove to seal between the first portion of the pneumatic core and an inner cylindrical surface of the tire stem, wherein the first portion of the pneumatic core includes a surface configured to engage and open the Schrader valve after the air passageway is sealed to the tire stem, wherein the twist-on cap includes a through-hole that has bottom section with interior threads, a middle section that has a cylindrical wall of a first diameter and a upper section that has a cylindrical wall of a second diameter that is smaller than the first diameter, wherein the pneumatic core includes a cylindrical second portion that has a larger diameter than the first cylindrical portion and that is sized to rotatably fit in the middle section of the twist-on cap, and wherein the pneumatic core includes a cylindrical third portion that has a smaller diameter than the second cylindrical portion and that is sized to rotatably fit in the upper section of the twist-on cap, wherein the cylindrical third portion of the pneumatic core includes a circumferential retainer-ring groove, and wherein the air chuck further includes a retainer ring that is positioned in the retainer-ring groove and configured to engage the retainer-ring groove to prevent dislodgement of the pneumatic core during operation.

In some other embodiments, the present invention provides a second air-chuck system for use with a tire stem having a Schrader valve, This second air-chuck system includes: an air chuck that includes twist-on cap; a pneumatic seal-and-valve-actuator core held partially within the twist-on cap; an O-ring made of a flexible resilient material; and a retaining clip, wherein the twist-on cap includes: a central channel having a first section having a cylindrical inner wall and a second section having a cylindrical inner wall that has a slightly larger-diameter than first cylindrical inner wall, and a third section having a threaded inner wall that matches corresponding outer threads of the tire stem, wherein the first section, the second section and the third section are each centered on a central longitudinal axis, an inner planar ledge located at a junction between the cylindrical inner wall of the first section and the cylindrical inner wall of the second section, and wherein the pneumatic seal-and-valve-actuator core 200 includes: a barbed air-hose attachment section 213 that includes a plurality of barbs 212, each having a conical top surface and flat bottom surface to facilitate one-way attachment of an air hose, a first cylindrical section that is sized to fit into, and easily rotate in the first section of the twist-on cap, a second cylindrical section that is sized to fit into, and easily rotate in the second section of the twist-on cap, an outer planar ledge located at a junction between the first cylindrical section and the second cylindrical section of the pneumatic seal-and-valve-actuator core, wherein the inner planar ledge of the twist-on cap presses against, and rotates relative to, the outer planar ledge of the pneumatic seal-and-valve-actuator core as the twist-on cap is rotated to advance on threads of the tire stem, a circumferential groove formed in the first cylindrical section of the pneumatic seal-and-valve-actuator core that receives and retains the retaining clip, a third cylindrical section that is sized to fit into an inner portion of the tire stem, wherein the third cylindrical section includes an O-ring groove, wherein the O-ring is positioned at least partially in the O-ring groove, wherein the third cylindrical section includes a cylindrical depression formed in a bottom portion of the third cylindrical section, and wherein the cylindrical depression has a top surface, an air passageway formed by a first hole drilled from a top end of the pneumatic seal-and-valveactuator core, and one or more spaced-apart bottom-drilled holes through the top wall of the cylindrical depression, wherein the one or more spaced-apart bottom-drilled holes open into the first hole to extend the air passageway from the bottom cylindrical depression to the first hole 208 and wherein the top surface of the cylindrical depression, through which the spaced-apart one or more bottom-drilled holes (e.g., hole 207A) are made, provides an actuating surface that presses against a piston of the Schrader valve in the tire stem as the twist-on cap advances on threads of the tire stem after the O ring seals the air passageway to an inner portion of the tire stem.

Some embodiments further include an air valve having an input port and an output port; and an air-pressure gauge operatively coupled to the output port, wherein the air valve is configured to receive pressurized air from an air supply connected to the input port and to selectively open to allow air flow though the output port which is coupled to the air chuck, or to close to isolate the air supply from the air chuck and thus allow the air-pressure gauge to measure air pressure from the tire stem.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. An air-chuck system with single rotary attachment, sealing and valve-actuation function for use with a tire stem having a Schrader valve, the air-chuck system comprising:
an air chuck that includes:
   a twist-on cap; and
   a pneumatic seal-and-valve-actuator core held partially within the twist-on cap,
wherein the twist-on cap has a first end that is open and an opposite second end having an interior ledge that engages with an exterior ledge of the pneumatic seal-and-valve-actuator core, and having interior threads that engage outer threads of the tire stem to allow a user to attach the air chuck to the tire stem with a rotational motion of the twist-on cap,
wherein the pneumatic seal-and-valve-actuator core includes an air passageway extending from an outer end to an inner end of the pneumatic seal-and-valve-actuator core,
wherein no part of the inner end of the pneumatic seal-and-valve-actuator core extends beyond a plane defined by the first end of the twist-on cap,
wherein a cylindrical first portion of the pneumatic seal-and-valve-actuator core includes an elastomeric seal positioned around the first portion of the pneumatic seal-and-valve-actuator core to seal against an inner circumference of the tire stem to form a seal of the air passageway to the tire stem,
wherein the first portion of the pneumatic seal-and-valve-actuator core includes a Schrader-valve-actuation surface that is recessed within the pneumatic seal-and-valve-actuator core further from the first end of the twist-on cap than a proximal edge of the elastomeric seal, and
wherein the first portion of the pneumatic seal-and-valve-actuator core is configured to be progressively urged into the tire stem as the twist-on cap is rotated relative to the tire stem to engage successive ones of the outer threads of the tire stem, such that upon rotation of the twist-on cap by a sufficient number of turns, the elastomeric seal seals to an inner circumference of the tire stem before the Schrader-valve actuation-surface opens the Schrader valve, and upon further rotation of twist-on cap, the pneumatic seal-and-valve-actuator core actuates the Schrader valve to open after the seal is established.

2. The air-chuck system of claim 1, wherein the first portion of the pneumatic seal-and-valve-actuator core includes an outer circumferential O-ring groove, wherein the elastomeric is an O-ring made of rubber or a similar elastomeric material that is positioned in the O-ring groove to seal between the first portion of the pneumatic seal-and-valve-actuator core and an inner cylindrical surface of the tire stem, wherein the first portion of the pneumatic seal-and-valve-actuator core includes a surface configured to engage and open the Schrader valve after the air passageway is sealed to the tire stem, wherein an outer portion of the pneumatic seal-and-valve-actuator core includes a circumferential retainer-ring groove, and wherein the air chuck further includes a retainer ring that is positioned in the retainer-ring groove and configured to engage the retainer-ring groove to prevent dislodgement of the pneumatic seal-and-valve-actuator core during operation.

3. The air-chuck system of claim 1, wherein the elastomeric seal is made of rubber or a similar elastomeric material.

4. The air-chuck system of claim 1, wherein the first portion of the pneumatic seal-and-valve-actuator core includes a circumferential O-ring groove, and wherein the elastomeric seal includes an O-ring made of rubber or a similar elastomeric material that is positioned in the O-ring groove.

5. The air chuck system of claim 4, wherein the O-ring groove is configured to securely position the O-ring within the tire stem to ensure a leak-proof seal between an inner surface of the tire stem and the first portion of the pneumatic seal-and-valve-actuator core.

6. The air-chuck system of claim 1, wherein an outer portion of the pneumatic seal-and-valve-actuator core includes a circumferential retainer-ring groove, and wherein the air chuck further includes a retainer ring that is positioned in the retainer-ring groove and configured to engage the retainer-ring groove to prevent dislodgement of the pneumatic seal-and-valve-actuator core during operation.

7. The air chuck system of claim 1, wherein the air passageway allows air to flow from a connected air source through the tire stem upon the actuation of the Schrader valve.

8. The air chuck system of claim 1, further comprising:
an air valve having an input port and an output port; and
an air-pressure gauge operatively coupled to the output port, wherein the air valve is configured to receive pressurized air from an air supply connected to the input port and to selectively open to allow air flow though the output port which is coupled to the air chuck, or to close to isolate the air supply from the air chuck and thus allow the air-pressure gauge to measure air pressure from the tire stem.

9. The air-chuck system of claim 1, further comprising:
an air valve having an input port and an output port; and
an air-pressure gauge operatively coupled to the output port, wherein the air valve is configured to receive pressurized air from an air supply connected to the input port and to selectively open to allow air flow though the output port which is coupled to the air chuck, or to close to isolate the air supply from the air chuck and thus allow the air-pressure gauge to measure air pressure from the tire stem, wherein the first portion of the pneumatic seal-and-valve-actuator core includes an outer circumferential O-ring groove, wherein the elastomeric seal is an O-ring made of rubber or a similar elastomeric material that is positioned in the O-ring groove to seal between the first portion of the pneumatic seal-and-valve-actuator core and an inner cylindrical surface of the tire stem, wherein the first portion of the pneumatic seal-and-valve-actuator core includes a surface configured to engage and open the Schrader valve after the air passageway is sealed to the tire stem, wherein an outer portion of the pneumatic seal-and-valve-actuator core includes a circumferential retainer-ring groove, and wherein the air chuck further includes a retainer ring that is positioned in the retainer-ring groove and configured to engage the retainer-ring groove to prevent dislodgement of the pneumatic seal-and-valve-actuator core during operation.

10. The system of claim 1, wherein pneumatic seal-and-valve-actuator core is made of brass.

11. The system of claim 1, wherein pneumatic seal-and-valve-actuator core is made of metal selected from the group consisting of aluminum, brass, and stainless steel.

12. The system of claim 1, wherein twist-on cap is made of brass.

13. The system of claim 1, wherein twist-on cap is made of metal selected from the group consisting of aluminum, brass, and stainless steel.

14. The system of claim 1, wherein pneumatic seal-and-valve-actuator core is at least partially made of a polymer.

15. The system of claim 1, wherein twist-on cap is at least partially made of a polymer.

16. The system of claim 1, wherein the pneumatic seal-and-valve-actuator core includes:
a dedicated O-ring groove, wherein the air chuck further includes an O-ring positioned substantially within the O-ring groove, wherein the O-ring is made of rubber or similar elastomeric material and is seated in the dedicated O-ring groove of the pneumatic seal-and-valve-actuator core;
an air passageway that is a pneumatic conduit within the pneumatic seal-and-valve-actuator core that allows air to flow from the connected air source through the tire stem once the Schrader valve is opened; and
a retainer-ring groove, wherein the air chuck further includes a retainer clip positioned in the retainer-ring groove.

17. The air-chuck system of claim 1, wherein the first cylindrical portion of the pneumatic seal-and-valve-actuator core includes an outer circumferential O-ring groove, wherein the elastomeric seal is an O-ring made of rubber or a similar elastomeric material that is positioned in the O-ring groove to seal between the first portion of the pneumatic seal-and-valve-actuator core and an inner cylindrical surface of the tire stem, wherein the twist-on cap includes a through-hole that has bottom section with interior threads, a middle section that has a cylindrical wall of a first diameter and a upper section that has a cylindrical wall of a second diameter that is smaller than the first diameter, wherein the pneumatic seal-and-valve-actuator core includes a cylindrical second portion that has a larger diameter than the first cylindrical portion and that is sized to rotatably fit in the middle section of the twist-on cap, and wherein the pneumatic seal-and-valve-actuator core includes a cylindrical third portion that has a smaller diameter than the second cylindrical portion and is sized to rotatably fit in the upper section of the twist-on cap, wherein the cylindrical third portion of the pneumatic seal-and-valve-actuator core includes a circumferential retainer-ring groove, and wherein the air chuck further includes a retainer ring that is positioned in the retainer-ring groove and configured to engage the retainer-ring groove, wherein the retainer ring presses against a top surface of the twist-on cap as the twist-on cap is rotated to disengage from the tire stem, and an inner ledge of the twist-on cap presses against an outer ledge of the pneumatic seal-and-valve-actuator core when the twist-on cap is rotated to engage on the tire stem by advancing on threads of the tire stem, in order to prevent dislodgement of the pneumatic seal-and-valve-actuator core during operation.

18. An air-chuck system with single rotary attachment, sealing and valve-actuation function for use with a tire stem having a Schrader valve, the air-chuck system comprising:
an air chuck that includes:
a twist-on cap;
a pneumatic seal-and-valve-actuator core held partially within the twist-on cap;
an O-ring made of an elastomeric material; and
a retaining clip,
wherein the twist-on cap includes:
a central channel having a first section having a cylindrical inner wall and a second section having a cylindrical inner wall that has a slightly larger diameter than first cylindrical inner wall, and a third section having a threaded inner wall that matches corresponding outer threads of the tire stem, wherein the first section, the second section and the third section are each centered on a central longitudinal axis,
an inner planar ledge located at a junction between the cylindrical inner wall of the first section and the cylindrical inner wall of the second section, and
wherein the pneumatic seal-and-valve-actuator core includes:
an air-hose attachment section that facilitates attachment of an air hose,
a first cylindrical section that is sized to fit into, and easily rotate in the first section of the twist-on cap,
a second cylindrical section that is sized to fit into, and easily rotate in the second section of the twist-on cap,
an outer planar ledge located at a junction between the first cylindrical section and the second cylindrical section of the pneumatic seal-and-valve-actuator core, wherein the inner planar ledge of the twist-on cap presses against, and rotates relative to, the outer planar ledge of the pneumatic seal-and-valve-actuator core as the twist-on cap is rotated to advance on threads of the tire stem,
a circumferential groove formed in the first cylindrical section of the pneumatic seal-and-valve-actuator core that receives and retains the retaining clip,
a third cylindrical section that is sized to fit into an inner portion of the tire stem, wherein the third cylindrical section includes an O-ring groove, wherein the O-ring is positioned at least partially in the O-ring groove, wherein the third cylindrical section includes a cylindrical depression formed in a bottom portion of the third cylindrical section, and wherein the cylindrical depression has a valve-actuation top surface that is recessed within the third cylindrical section of the pneumatic seal-and-valve-actuator core further than a proximal edge of the O-ring groove, and an air passageway formed by a first hole drilled from a top end of the pneumatic seal-and-valve-actuator core, and one or more spaced-apart bottom-drilled holes through the valve-actuation top surface of the cylindrical depression, wherein the one or more spaced-apart bottom-drilled holes open into the first hole to extend the air passageway from the bottom cylindrical depression to the first hole, wherein the valve-actuation top surface of the cylindrical depression, through which the spaced-apart one or more bottom-drilled holes are made, provides an actuating surface that presses against a piston of the Schrader valve in the tire stem as the twist-on cap advances on threads of the tire stem after the O-ring seals the air passageway to an inner portion of the tire stem.

19. The air chuck system of claim 18, further comprising:
an air valve having an input port and an output port; and
an air-pressure gauge operatively coupled to the output port, wherein the air valve is configured to receive pressurized air from an air supply connected to the input port and to selectively open to allow air flow though the output port which is coupled to the air chuck, or to close to isolate the air supply from the air chuck and thus allow the air-pressure gauge to measure air pressure from the tire stem.

20. An air-chuck system for use with a tire stem having a Schrader valve, the air-chuck system comprising:

an air chuck that includes:
  a twist-on cap, wherein the twist-on cap has an open first end, and interior threads that engage outer threads of the tire stem enabling attachment of the air chuck to the tire stem through rotational motion of the twist-on cap; and
  a pneumatic seal-and-valve-actuator core held partially within the twist-on cap,
    wherein the pneumatic seal-and-valve-actuator core includes an air passageway extending from an outer end to an inner end of the pneumatic seal-and-valve-actuator core,
    wherein a first portion of the pneumatic seal-and-valve-actuator core includes an elastomeric O-ring positioned around the first portion and configured to seal against an inner circumference of the tire stem thereby sealing the air passageway to the tire stem,
    wherein the first portion of the pneumatic seal-and-valve-actuator core includes a Schrader-valve actuation surface that is recessed within the pneumatic seal-and-valve-actuator core at a position further from the open first end of the twist-on cap than is a proximal edge of the elastomeric O-ring, and
    wherein the first portion of the pneumatic seal-and-valve-actuator core is configured to be progressively urged into the tire stem as the twist-on cap is rotated relative to the tire stem engaging successive outer threads of the tire stem, such that:
      upon rotation of the twist-on cap by a sufficient number of turns, the elastomeric O-ring seals to an inner circumference of the tire stem before the Schrader-valve actuation surface opens the Schrader valve, and
      upon further rotation of twist-on cap, the pneumatic seal-and-valve-actuator core actuates the Schrader valve to open after the seal is established.

* * * * *